United States Patent [19]
Hannah et al.

[11] Patent Number: 6,053,333
[45] Date of Patent: *Apr. 25, 2000

[54] METHOD AND SYSTEM FOR TRANSFERRING SLUDGE, INCLUDING A PLOW FOR DISPERSING SLUDGE

[75] Inventors: Thomas D. Hannah, Evans City; Bruce E. Thieleman, Mars, both of Pa.

[73] Assignee: Roediger Pittsburgh, Inc., Allison Park, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/539,842

[22] Filed: Oct. 6, 1995

[51] Int. Cl.⁷ .......................... B01D 33/68; B01D 33/04
[52] U.S. Cl. ............................ 210/400; 210/396
[58] Field of Search .................... 210/396, 400, 210/401; 209/267

[56] References Cited

U.S. PATENT DOCUMENTS

| | | |
|---|---|---|
| 4,602,998 | 7/1986 | Goron . |
| 4,609,467 | 9/1986 | Morales . |
| 4,731,188 | 3/1988 | Johnson . |
| 4,986,911 | 1/1991 | Goron . |

FOREIGN PATENT DOCUMENTS 60-36879  8/1985  Japan .

Primary Examiner—Thomas M. Lithgow
Attorney, Agent, or Firm—Ansel M. Schwartz

[57] ABSTRACT

The present invention pertains to a system for transferring sludge. The system comprises a gravity deck machine having a belt which transports sludge and a first plow and at least a second plow disposed adjacent to the belt for dispersing sludge transported by the belt. The system is also comprised of a mechanism for moving the first plow and at least the second plow simultaneously from a first desired position to a second desired position. The present invention pertains to a method for transferring sludge. The method comprises the steps of placing the sludge on a belt of a gravity deck machine. Next there is the step of moving the sludge with the belt in a first direction so sludge is moved past a first plow and at least a second plow disposed at a first level in the sludge and dispersed by the first and second plows as the sludge moves past the plows. The second plow is positioned downstream of the first plow in regard to the sludge. Then there is the step of lifting the first plow and second plow simultaneously to a second level relative to the sludge.

15 Claims, 4 Drawing Sheets

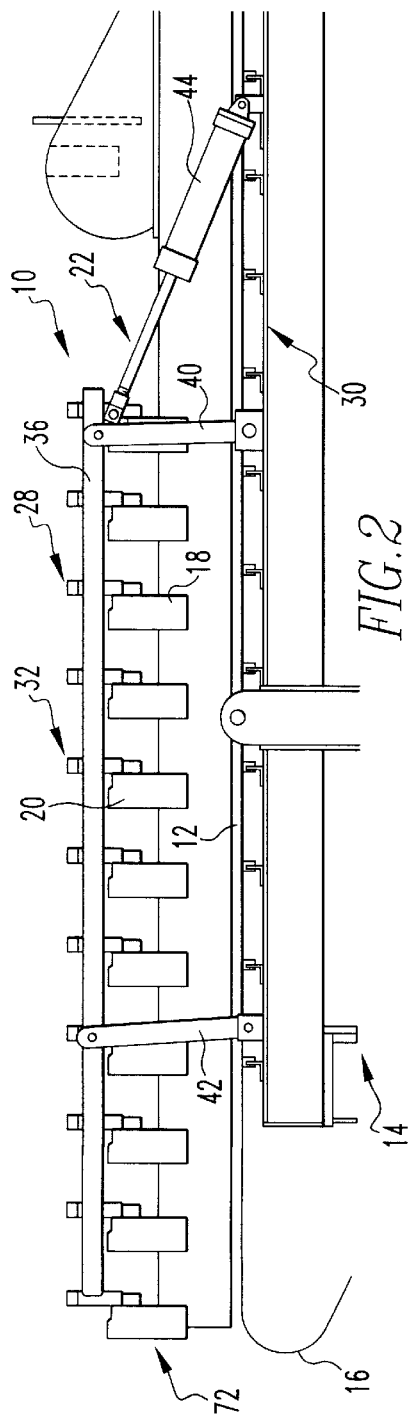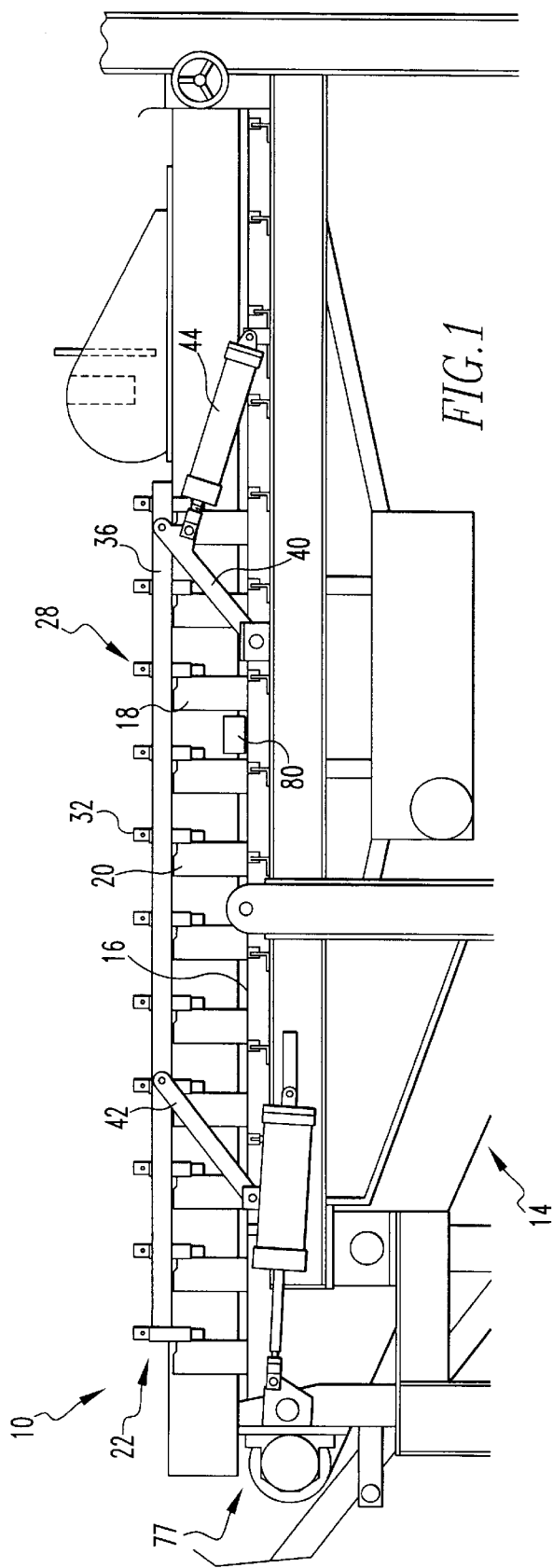

METHOD AND SYSTEM FOR TRANSFERRING SLUDGE, INCLUDING A PLOW FOR DISPERSING SLUDGE

FIELD OF THE INVENTION

The present invention is related to the separation of sludge during dewatering to allow water to move past the sludge to a porous belt which transports the sludge. More specifically, the present invention is related to an apparatus that raises and lowers plows of a gravity deck machine in unison through the action of a pneumatic at least one pneumatic lift.

BACKGROUND OF THE INVENTION

A typical gravity deck machine utilizes plows to disperse sludge that is transported by the gravity deck machine. The plows disperse the sludge by forcing the sludge to go around them. The plows create essentially a pocket behind them relative to the direction of movement of the sludge which allows fluid in the sludge to flow into the pocket and consequently through the porous belt that carries the sludge. Since the plows are disposed directly in the sludge, they not only receive wear and tear but sometimes facilitate clogs in the sludge flow that can back up the movement of the sludge by the belt.

A common practice in the industry in regard to handling the plows is for the manual manipulation of the plows by workmen by lifting the cross member to which the plows are held in place over the belt. This removes the plows from the sludge flow, thus removing the blockage that might be causing the clog. Furthermore, each plow is typically bolted or fixedly attached to the cross member, requiring the entire cross member to be lifted out of the gravity back machine to repair or replace the plow.

The present invention allows for the movement of all plows in a gravity deck machine simultaneously, and for the individual replacement of a given plow without the need to remove the cross member to which the plow is attached.

SUMMARY OF THE INVENTION

The present invention pertains to a system for transferring sludge. The system comprises a gravity deck machine having a belt which transports sludge and a first plow and at least a second plow disposed adjacent to the belt for dispersing sludge transported by the belt. The system is also comprised of a mechanism for moving the first plow and at least the second plow simultaneously from a first desired position to a second desired position.

The present invention pertains to a method for transferring sludge. The method comprises the steps of placing the sludge on a belt of a gravity deck machine. Next there is the step of moving the sludge with the belt in a first direction so sludge is moved past a first plow and at least a second plow disposed at a first level in the sludge and dispersed by the first and second plows as the sludge moves past the plows. The second plow is positioned downstream of the first plow in regard to the sludge. Then there is the step of lifting the first plow and second plow simultaneously to a second level relative to the sludge.

BRIEF DESCRIPTION OF THE DRAWINGS

In the accompanying drawings, the preferred embodiment of the invention and preferred methods of practicing the invention are illustrated in which:

FIG. 1 is a schematic representation of a mechanism for moving a first plow and at least a second plow simultaneously on a gravity deck machine, where the first plow and second plow are in a lowered position.

FIG. 2 is a schematic representation of the mechanism for moving the first plow and at least the second plow simultaneously attached to a gravity deck machine, where the first plow and second plow are in a raised position.

DESCRIPTION OF THE PREFERRED EMBODIMENT

Figure 3:
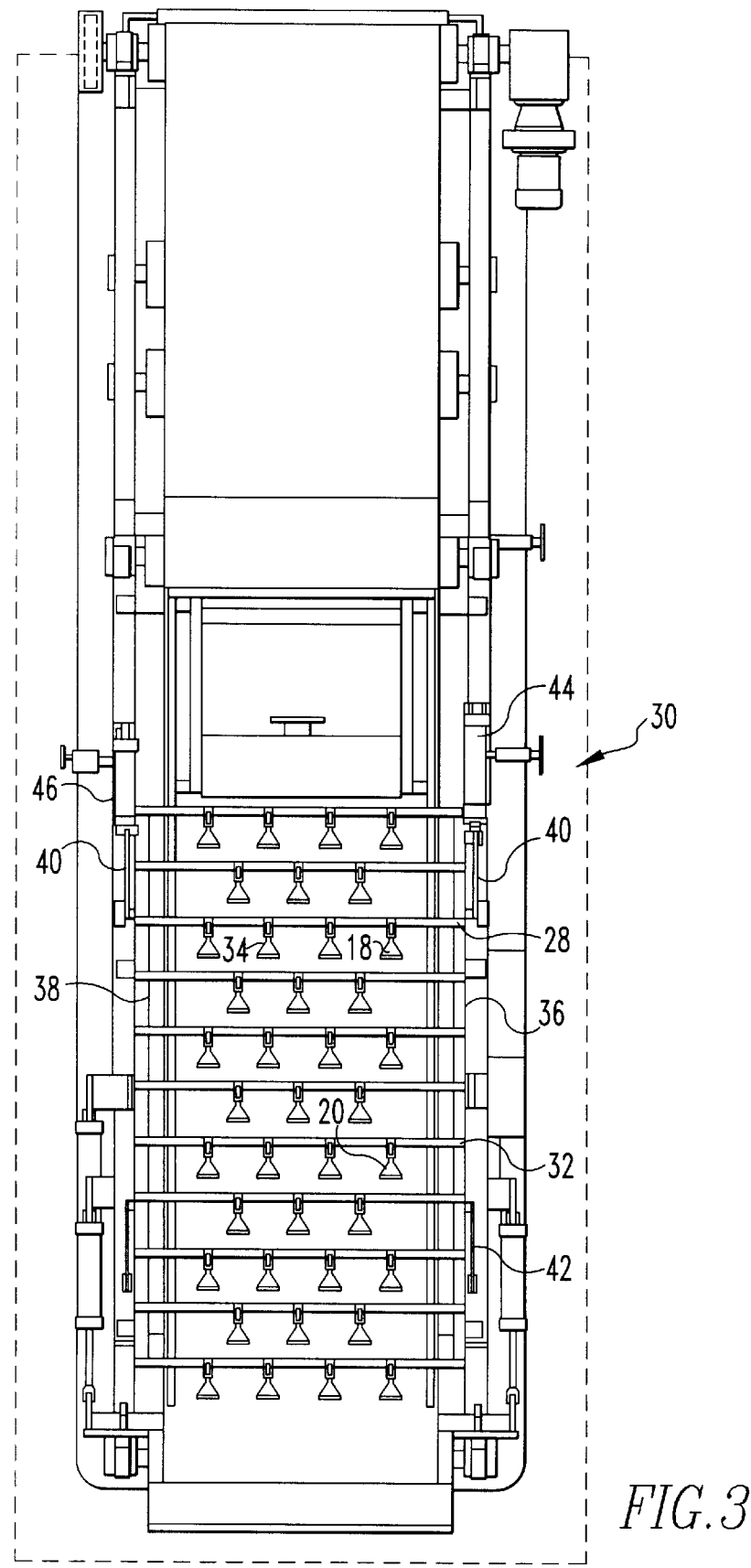
FIG. 3 is an overhead schematic representation of a system for transferring sludge of the present invention.
Figure 4:
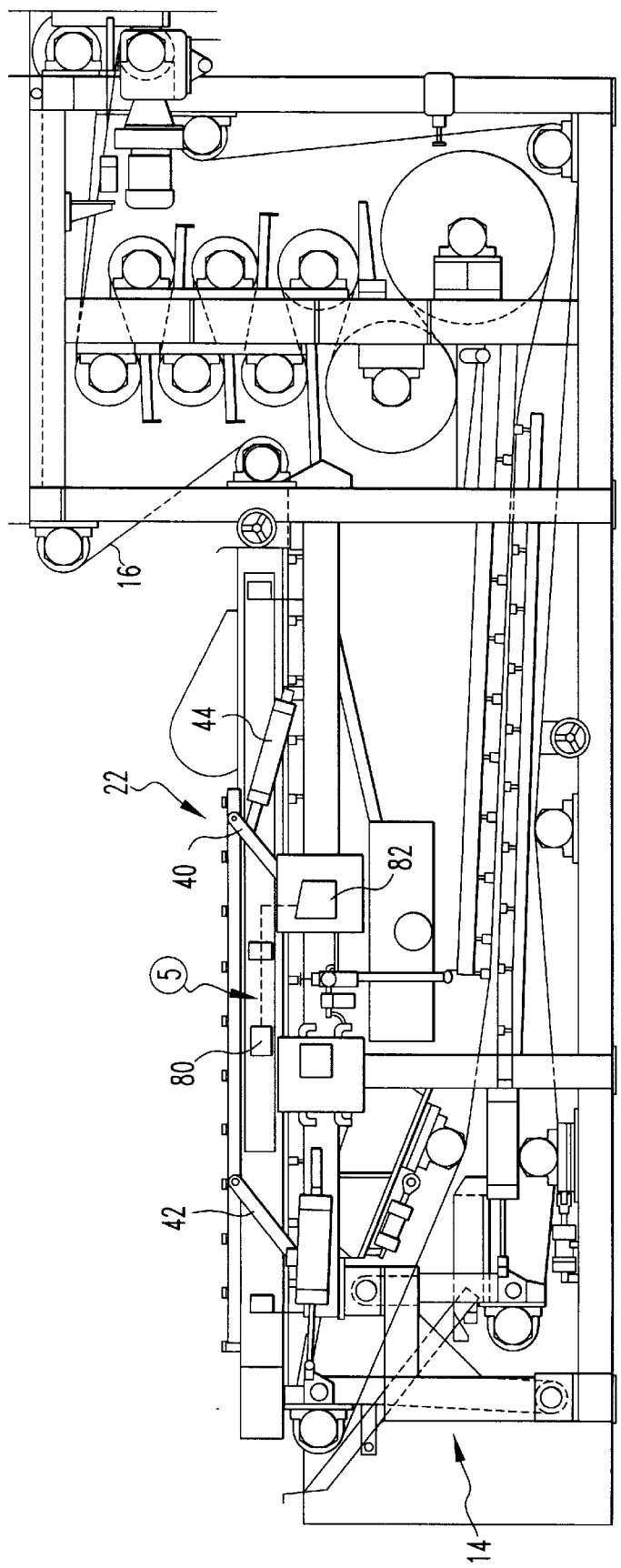
FIG. 4 is a schematic representation of a side view of the system for transferring sludge.

Referring now to the drawings wherein like reference numerals refer to similar or identical parts throughout the several views, and more specifically to FIGS. 1–4 thereof, there is shown a system 10 for transferring sludge 12. The system 10 comprises a gravity deck machine 14 having a belt 16 which transports sludge and a first plow 18 and at least a second plow 20 disposed adjacent to the belt 16 for dispersing sludge 12 transported by the belt 16. The system 10 is also comprised of a mechanism 22 for moving the first plow 18 and at least the second plow 20 simultaneously from a first desired position, as shown in FIG. 1, to a second desired position, as shown in FIG. 2. Preferably, the first desired position is closer to the belt 16 than the second desired position.

The moving mechanism 22 preferably includes a first cross member 28 connected to the gravity deck machine 14 disposed above the belt 16. The system 10 preferably also includes a third plow 34. The first plow 18 and at least the third plow 34 are each connected to the first cross member 28. The moving mechanism 22 preferably also includes a forcing mechanism 30 for moving the first cross member 28 between the first desired position and the second desired position. The forcing mechanism 30 is connected to the first cross member 28. The moving mechanism 22 preferably includes at least a second cross member 32 connected to the gravity deck machine 14. The forcing mechanism 30 is preferably disposed above the belt 16. The second plow 20 is preferably connected to the second cross member 32 which moves between the first desired position and the second desired position when the forcing mechanism 30 moves the second cross member 32.

The moving mechanism 22 preferably includes a first support member 36 connected to the gravity deck machine 14 and a second support member 38 connected to the gravity deck machine 14. Each cross member is connected to the first and second support member and held by the first and second support member above the belt 16. The forcing mechanism 30 is connected to the first and second support members to move the first and second support members, which moves the first and second cross members connected to the first and second support members and the plows connected to the first and second cross members. Preferably, the first support member 36 is in parallel with the second support member 38. Preferably, the first cross member 28 is in parallel with the second support member 38. Each cross member is preferably perpendicular with each support member. Each support member is preferably in parallel with a direction of movement of the belt 16. Each cross member is preferably disposed perpendicular to the direction of movement of the belt 16.

The forcing mechanism 30 preferably includes a first brace 40 connected to the first support member 36 and the gravity deck machine 14, and at least a second brace 42 connected to the second support member 38 and the gravity deck machine 14. Preferably, the forcing mechanism 30 includes a first pneumatic lift 44 connected to the gravity deck machine 14 and the first brace 40 to move the first brace 40. The forcing mechanism 30 can include a second pneumatic lift 46 connected to the second brace 42 and the gravity deck machine 14 to move the second brace 42. The first pneumatic lift 44 and the second pneumatic lift 46 preferably operate in unison.

Figure 6:
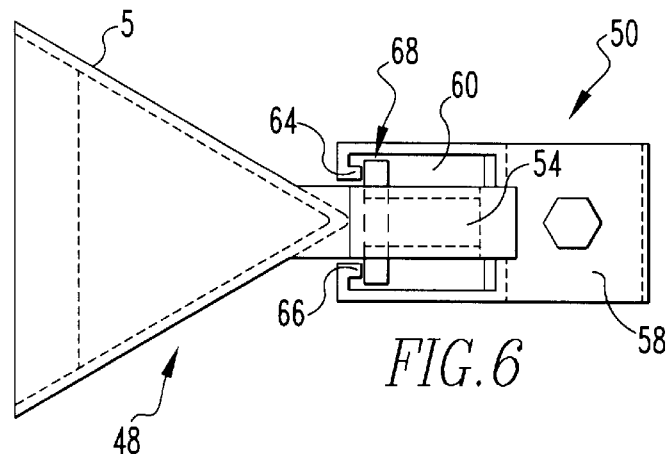
FIG. 6 is an overhead schematic representation of a plow.
Figure 7:
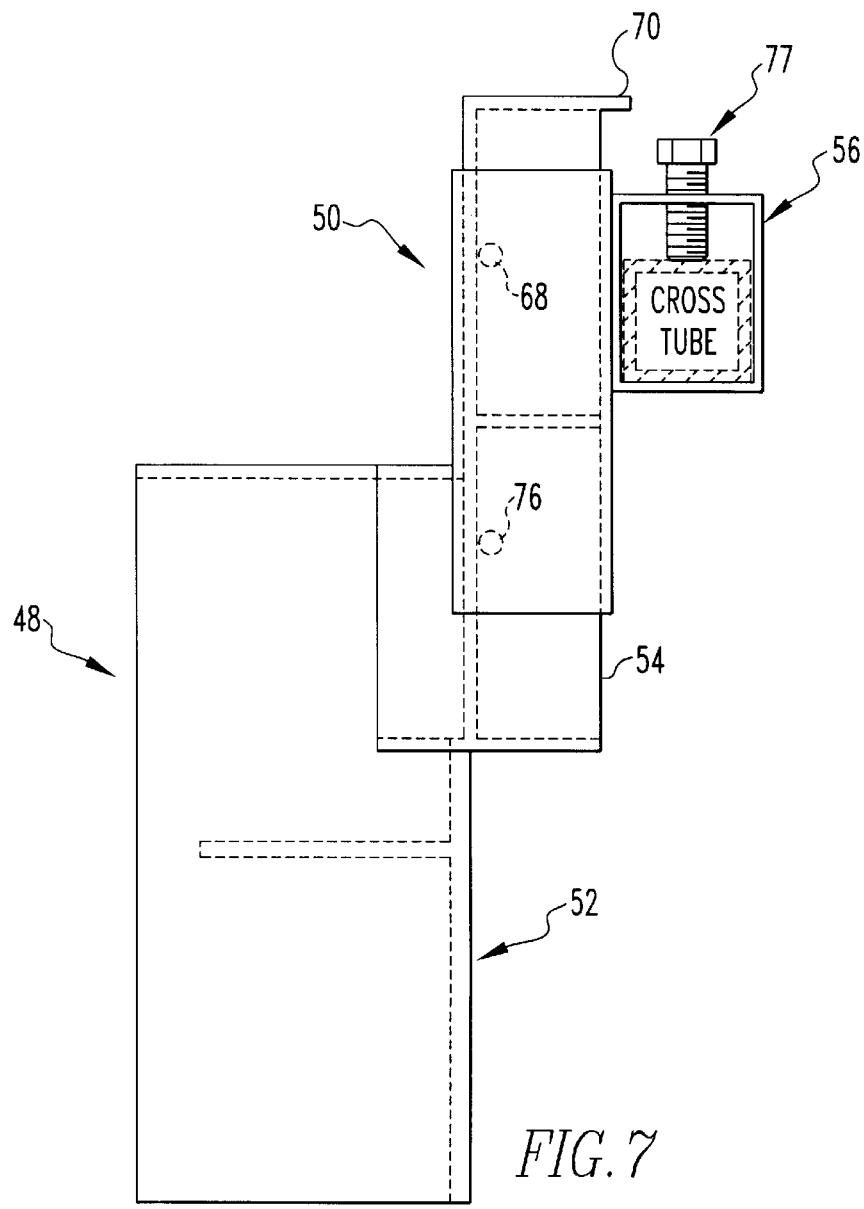
FIG. 7 is a schematic representation of a side view of a plow in relationship to a cross member.

Each plow for the gravity deck machine 14 comprises a first portion 48 which causes sludge 12 moving in a horizontal direction on the gravity deck machine 14 to move about the first portion 48 when the first portion 48 is disposed in sludge 12, as shown in FIGS. 6 and 7. Each plow is also comprised of a second portion 50 which receives the first portion 48 and connects with the gravity deck machine 14 to position the first portion 48 in the sludge 12. The first portion 48 is disposed in the second portion 50 so the first portion 48 can move in a vertical direction perpendicular to horizontal direction of movement of the sludge 12 but constraining the first portion 48 from moving in a horizontal direction. The first portion 48 is preferably comprised of a sludge divider 52 which is disposed in the sludge 12 during operation, and a stem 54 attached to the sludge divider 52 and extending from the sludge divider 52. The stem 54 engages with the second portion 50.

Preferably, the second portion 50 is comprised of a first tube 56 having a first tube axis 58 disposed parallel to the horizontal direction of movement of the sludge 12 on the gravity deck machine 14. The first tube 56 receives a cross member from which the first tube 56 is supporting during operation. The second portion 50 preferably is also comprised of a slot 60 having a slot axis 62 which is perpendicular to the horizontal direction of movement of the sludge 12. The stem 54 is disposed in the slot 60. The slot 60 is attached to the first tube 56. The slot 60 preferably has a first flange 64 and a second flange 66 which opposes the first flange 64. The first portion 48 preferably has a first clip 68 that extends through the stem 54. The first clip 68 engages with the first and second flanges to maintain the stem 54 in the slot 60 and prevent the stem 54 from moving out of the slot 60 in the horizontal direction parallel to movement of the sludge 12. The stem 54 preferably has a cap 70 which is larger than the horizontal cross section of the slot 60. The cap 70 prevents the stem 54 from moving out of the slot 60 in a vertical direction toward the sludge 12. Preferably, the sludge divider 52 has a V-shaped horizontal cross section. The sludge divider 52 is preferably connected to the stem 54 at the top front of the V-shaped horizontal cross section.

The present invention pertains to a method for transferring sludge 12. The method comprises the steps of placing the sludge 12 on a belt 16 of a gravity deck machine 14. Next there is the step of moving the sludge with the belt 16 in a first direction so sludge 12 is moved past a first plow 18 and at least a second plow 20 disposed at a first level 72 in the sludge 12 and dispersed by the first and second plows as the sludge 12 moves past the plows. The second plow 20 is positioned downstream of the first plow 18 in regard to the sludge 12. Then there is the step of lifting the first plow 18 and second plow 20 simultaneously to a second level 77 relative to the sludge 12. Preferably, the lifting step includes the step of moving simultaneously a first cross member 28 and a second cross member 32 disposed over the belt 16 with the sludge 12 to move the first plow 18 and second plow 20 to the second level 74. The first plow 18 and second plow 20 are connected to the first cross member 28 and the second cross member 32, respectively, and extend down from the first and second cross member, respectively. The first and second cross members are disposed perpendicular to the first direction.

In the operation of the invention, plows are disposed on a belt 16 of a gravity deck machine 14. As the belt 16 moves on the gravity deck machine 14, sludge 12 on the belt 16 is also transferred. As the belt 16 moves with the sludge 12 on it, the sludge moves around the plows. The plow causes the sludge to separate around it and thus allow the liquid in the sludge to be shifted and flow to the belt 16 which is porous. The liquid is able to flow through the porous belt 16. Each plow causes the sludge 12 to separate, allowing fluid to flow to the belt to further allow the sludge 12 to be dewatered.

Each plow is connected to a cross member from which it is disposed on the belt 16. Each cross member is disposed over the belt 16 and arranged perpendicular to the direction of motion of the belt 16. Each cross member is connected to a first support member 36 and a second support member 38. The first support member 36 and the second support member 38 are disposed on the gravity deck machine 14 on each side of the belt 16, extending in parallel with the direction of the movement of the belt 16. Each support member is connected to the gravity deck machine 14 through a first brace 40 and a second brace 42. Each brace is rotatably connected to the gravity deck machine 14 and is rotatably connected to its respective support member.

Connected to the first brace 40 is a first pneumatic lift 44. Connected to the second brace 42 is a second pneumatic lift 46. Each pneumatic lift is also connected to the gravity deck machine 14. When each pneumatic lift is activated, it pushes on the respective brace, raising it. Since each brace is connected to the respective support member, the respective support member is also lifted as the brace is lifted. In turn, each of the cross members are connected to the respective support members. When the support members are lifted by the action from the pneumatic lift, all the cross members are lifted and the plows connected to the cross members are thus lifted from a first desired position 24 to a second desired position 26. Similarly, when the pneumatic lifts are retracted, they cause the respective braces to move downward, which in turn moves the support members to which they are connected downward, thus moving the cross members downward and the plows that are connected to the cross members down onto the belts 16 again to shift the sludge 12.

Each plow is connected to a cross member through a first tube 56 that has a first tube axis that aligns with the cross member axis. Connected to the first tube 56 is a slot 60 that has an axis essentially perpendicular with the axis of the first tube 58. The slot 60 receives a stem which is disposed in the slot 60. From the stem 54 extends a sludge divider 52 that is V-shaped with the V pointing into the direction from which the sludge 12 comes. A stem 54 has a clip disposed across it which fits into the slot 60 and abuts a first flange 64 and a second flange 66 of the slot 60 to prevent the sludge divider 52 and the stem 54 from separating from the slot 60. Ideally, there is a first clip 68 and a second clip 76 which serve to hold the stem 54 in place by abutting the first flange 64 and second flange 66 of the slot 60. The stem 54 also has a cap 70 which extends over the top of the slot 60. The presence of the cap prevents the stem 54 from sliding out the bottom of the slot 60. This could happen, for instance, by the sludge divider 52 being worn away from the action of the belt 16 against the bottom of the sludge divider 52. The cap 70 defines a lowest point by which the sludge divider 52 is disposed relative to the belt 16. A rivet or pin 77 extends through the first tube 56 and onto the cross tube to fix the plow in place to the cross member.

In order to remove the plow, it is a simple matter of just lifting the plow by its cap 70 straight up out of the slot 60 since there is nothing to restrain the movement of the stem 54 and sludge divider 52 in an upward vertical direction.

Figure 5:
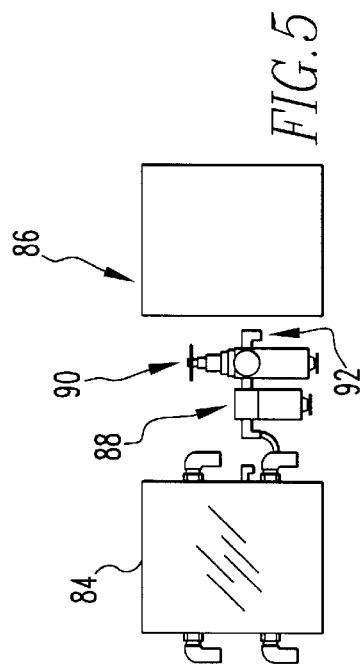
FIG. 5 is an expanded view of section 5 of FIG. 4.

As shown in FIG. 5, the moving mechanism includes a pneumatics control station 84 which controls the pressure provided to the first and second pneumatic lifts. There is also a junction box 86 which controls the operation of pneumatics control station. There is an oil coalescing filter 88 preferably of 0.3 microns for filtering the oil on the pneumatic lifts. There is a filter/regulator 90 also preferably of 0.3 microns for the oil, and a pneumatic connection 92 preferably ¼" which connects the oil from the pneumatic control station to the specific pneumatic lifts.

The pneumatic lifts can be operated automatically if necessary, for instance, if the sludge begins to become clogged on the gravity deck machine 14. In this regard, a flow meter 80 which would detect the movement of the sludge 12 is connected to, for instance, an actuator 82 which would trigger the operation of pneumatic lifts. The flow meter senses that the movement of the sludge has fallen below a certain threshold speed and causes a signal to be sent to the actuator, triggering it. Once the actuator is triggered, the pneumatic lift then moves to lift the support members and thus the plows connected to the cross members on the support members of the sludge. The sludge is then able to pass and the clog should then relieve itself. After some fixed period of time, about 25 seconds, the pneumatic lift then retracts causing the plows to be inserted back into the sludge to resume their function to separate the sludge so fluid can flow through the belt.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A sludge dewatering machine comprising: a water-permeable belt which transports sludge in a substantially horizontal direction and having at least one sludge divider means riding on the belt for dispersing the sludge transported on the belt, said sludge divider means causing the sludge moving on the belt to move about the sludge divider means while the sludge divider means is disposed in the sludge and riding on the belt, said sludge divider means moving in a vertical direction as it is worn away by the belt so that said sludge divider means remains in contact with the belt, said sludge divider means being connected by a connecting means for engaging the sludge divider means with a cross member of said sludge dewatering machine such that the sludge divider means can move in vertical direction relative to said cross members, while the connecting means constrains the sludge divider means from moving in horizontal direction, and said sludge divider means is mounted, relative to the cross member, so as to allow said sludge dividing means to be disengaged from the cross member and be removed from the cross member by lifting action, whereby the sludge divider means is lifted relative to the cross member.

2. A sludge dewatering machine as described in claim 1 including a mechanism for lifting the cross member and the sludge divider means from the belt.

3. A system for sludge dewatering comprising: a sludge dewatering machine with a traveling water-permeable belt which transports sludge in a substantially horizontal direction and at least one sludge divider means riding on the belt for dispersing sludge transported on the belt, said sludge divider means comprising a plow which causes the sludge to move about to a right or a left side of said plow relative to sludge movement when said plow is disposed in the sludge; and connecting means engaging the sludge divider means with a cross member of the machine to position the sludge divider means in the sludge, whereby said sludge divider means is supported by said connecting means such that the sludge divider means can move in a substantially vertical direction relative to the cross member and substantially perpendicular to the belt and sludge movement, but remains constrained from moving in the direction of the belt and sludge movement, said sludge divider means being slidingly connected relative to the cross member such that the plow is kept by weight on the belt as it is worn away and said sludge divider means is mounted, relative to said cross member, so as to allow said sludge divider means to be removable relative to the cross member by lifting action, whereby the plow is lifted relative to the cross member.

4. A system as described in claim 3 wherein said sludge divider means comprises a stem which is engaged by said connecting means and said connecting means is connected with said cross member and comprises a substantially vertical tube with an open upper end and a slot extending along said tube, said stem penetrating said slot and having an enlargement being engaged by said tube such that the enlargement is retained with said tube so that the stem cannot move in the direction of the belt movement while the stem can move along said slot.

5. A system as described in claim 4 wherein said stem has a cap projecting from the stem and engaging with said connecting means when the cross member is lifted relative to said machine and belt thus limiting sliding downward movement of said sludge divider means relative to the cross member and lifting said plow from the belt.

6. A system as described in claim 3 wherein said plow has a V-shaped horizontal cross section, the edge of the V-shaped horizontal cross section pointing against the direction of the belt movement.

7. A system as described in claim 3 wherein the cross member extends horizontally above the belt and traversal to the direction of the belt movement.

8. A system as described in claim 3 wherein at least a second cross member extends supporting at least a second sludge divider means is connected by a support member with said cross member.

9. A system as described in claim 8 wherein said cross members have first ends and second ends, said first ends being connected by said support member and said second ends being connected by a second support member forming a cross member frame.

10. A system as described in claim 9 wherein said cross member frame is connected with the dewatering machine by at least one pivoting brace having two pivoting axes such that said pivoting brace can be pivoted relative to said dewatering machine and relative to said cross member frame in order to lift said cross member frame relative to said cross member frame in order to lift said cross member frame relative to said dewatering machine.

11. A system as described in claim 10 wherein at least one brace is connected with the dewatering machine by forcing mechanism.

12. A system as described in claim 11 wherein said forcing mechanism comprises a pneumatic or hydraulic cylinder.

13. A system as described in claim 3 wherein said cross member is liftable relative to said machine and belt and said connecting means comprise catch means limiting sliding down movement of the sludge divider means such that the sludge divider means is lifted from the belt when said cross member is lifted.

14. A system for sludge dewatering comprising:

a traveling water-permeable belt which transports sludge in a substantially horizontal direction and at least one sludge divider means riding on the belt for dispersing sludge transported on the belt; connecting means engaging the sludge divider means with a positioning means located above the belt to position the sludge divider means, whereby said sludge divider means is engaged with said positioning means such that the sludge divider means can move in a substantially vertical direction relative to the positioning means and said belt so that the sludge divider means keeps riding on the belt as it is worn away, but remains constrained from moving relative to the positioning means in the direction of the belt and sludge movement, said sludge divider means being laterally offset from the positioning means such that the sludge divider can be disengaged and removed from the positioning means by lifting action, whereby the sludge divider means is lifted relative to the positioning means.

15. A system as described in claim 14 wherein said positioning means can be lifted relative to the belt and said connecting means comprise catch means limiting the substantially vertical downward movement of said sludge divider means such that the sludge divider means is lifted from the belt when the positioning means is lifted.

* * * * *